United States Patent
Pei et al.

(10) Patent No.: US 12,327,385 B2
(45) Date of Patent: Jun. 10, 2025

(54) END-TO-END DEEP GENERATIVE NETWORK FOR LOW BITRATE IMAGE CODING

(71) Applicants: SANTA CLARA UNIVERSITY, Santa Clara, CA (US); KWAI INC., Palo Alto, CA (US)

(72) Inventors: Yifei Pei, Santa Clara, CA (US); Ying Liu, Santa Clara, CA (US); Nam Ling, Santa Clara, CA (US); Yongxiong Ren, San Jose, CA (US); Lingzhi Liu, San Jose, CA (US)

(73) Assignees: SANTA CLARA UNIVERSITY, Santa Clara, CA (US); KWAI INC., Palo Alto, CA (US)

( * ) Notice: Subject to any disclaimer, the term of this patent is extended or adjusted under 35 U.S.C. 154(b) by 344 days.

(21) Appl. No.: 17/969,551

(22) Filed: Oct. 19, 2022

(65) Prior Publication Data
US 2024/0185473 A1    Jun. 6, 2024

(51) Int. Cl.
G06T 9/00  (2006.01)
G06N 3/0455  (2023.01)
(Continued)

(52) U.S. Cl.
CPC .......... G06T 9/002 (2013.01); G06N 3/0455 (2023.01); G06N 3/0475 (2023.01); G06N 3/094 (2023.01); H04N 19/124 (2014.11)

(58) Field of Classification Search
CPC .......... G06T 9/002; G06T 2207/20081; G06T 3/4046; G06T 2207/20084; G06T 5/50;
(Continued)

(56) References Cited

U.S. PATENT DOCUMENTS 11,153,566 B1 * 10/2021 Tao .................. H04N 19/124
11,415,571 B2 * 8/2022 Larsen ............... G01N 33/5008
(Continued)

FOREIGN PATENT DOCUMENTS

WO    WO-2022067656 A1 *  4/2022

OTHER PUBLICATIONS

Search machine translation of WO 2022/067656 A1 to Lyu, Image Processing Method and Apparatus, translated: Nov. 21, 2024, 33 pages. (Year: 2024).*

(Continued)

*Primary Examiner* — Henok Shiferaw
*Assistant Examiner* — Dennis Rosario
(74) *Attorney, Agent, or Firm* — Arch & Lake LLP; Hao Tan; Shen Wang

(57) ABSTRACT

A neural network system, a method and an apparatus for image compression are provided. The neural network may include a generator including an encoder, an entropy estimator, and a decoder, where the encoder receives an input image and generates an encoder output, a plurality of quantized feature entries are obtained based on the encoder output outputted at a last encoder block, the entropy estimator receives the plurality of quantized feature entries and calculates an entropy loss based on the plurality of quantized feature entries, and the decoder receives the plurality of quantized feature entries and generates a reconstructed image. Furthermore, the neural network may include a discriminator that determines whether the reconstructed image different from the input image based on a discriminator loss. Moreover, the generator may determine whether content of the reconstructed image matches content of the input image based on a generator loss including the entropy loss.

18 Claims, 5 Drawing Sheets

(51) Int. Cl.
  *G06N 3/0475* (2023.01)
  *G06N 3/094* (2023.01)
  *H04N 19/124* (2014.01)
(58) Field of Classification Search
  CPC ........ G06T 5/60; G06N 3/045; G06N 3/0455;
        G06N 3/0475; G06N 3/094; G06V 10/82;
        G06V 10/774; G06V 10/40; G06V
        10/454; H04N 19/124; H04N 19/91;
        H04N 19/00; H04N 19/85; H04N 19/184;
        H04N 19/13; H04N 19/42; G06F 18/214;
        G06F 18/2148; G06F 18/2155; G06F
        18/213
  See application file for complete search history.

(56) References Cited

U.S. PATENT DOCUMENTS

| | | | | |
|---|---|---|---|---|
| 11,558,620 | B2* | 1/2023 | Besenbruch | H04N 19/13 |
| 2009/0099986 | A1* | 4/2009 | Varma | G06F 15/16 |
| | | | | 706/12 |
| 2012/0294355 | A1* | 11/2012 | Holcomb | H04N 19/157 |
| | | | | 375/240.03 |
| 2024/0185075 | A1* | 6/2024 | Du | H04N 19/521 |

OTHER PUBLICATIONS

Liu et al., Facial Image Inpainting Using Multi-Level Generative Network, Jul. 8-12, 2019 [retrieved Nov. 21, 2024], 2019 IEEE International Conference on Multimedia and Expo (ICME), pp. 1168-1173. DOI: 10.1109/ICME.2019.00204 (Year: 2019).*
Yang, Jiayu et al., "Learned Low Bit-rate Image Compression with Adversarial Mechanism", Peking University, China, CVPR 2020 workshop paper Open Access Version provided by Computer Vision Foundation and final published version of the proceedings available on IEEE Xplore, (5p).
Mentzer, Fabian et al., "High-Fidelity Generative Image Compression", 34th Conference on Neural Information Processing Systems (NeurIPS2020), Vancouver, Canada, (12p).
Setiawan, Antonius Darma et al., "Low-Bitrate Medical Image Compression", 14-32 MVA2011 IAPR Conference on Machine Vision Applications, Jun. 13-15, 2011, Nara, Japan, (5p).
Johannes Balle et al., "End-To-End Optimized Image Compression", arXiv:1611.01704v3, [cs.CV] Mar. 3, 2017, Published as a conference paper at ICLR 2017, (27p).
J. Ballé, et al., "Variational image compression with a scale hyperprior," arXiv:1802.01436v2, [eess.IW] May 1, 2018, Published as a conference paper at ICLR 2018,(23p).
Z. Cheng, et al., "Learned image compression with discretized gaussian mixture likelihoods and attention modules," in Proceedings of the IEEE Xplore, provided by the Computer Vision Foundation,(10p).
"Generative Adversarial Networks for Extreme Learned Image Compression," Under review as a conference paper at CLR 2019, (31p).
N. Ling, et al, "The future of video coding," APSIPA Transactions on Signal and Information Processing, 2022, 11, e16, (29p).
S. Iwai, et al., "Fidelity-controllable extreme image compression with generative adversarial networks," arXiv:2008.10314v1 [eess.IV] Aug. 24, 2020,(8p).
F. Mentzer, et al., "High-fidelity generative image compression," arXiv:2006.09965v3 [eess.IV] Oct. 23, 2020,(20p).
Goodfellow, J. et al., "Generative adversarial nets," Advances in neural information processing systems, vol. 27, 2014, (9p).
M. Arjovsky, et al., "Wasserstein generative adversarial networks," in International conference on machine earning. PMLR, 2017, (10p).
I. Gulrajani, et al., "Improved training of wasserstein gans," Advances in neural information processing systems, vol. 30, 2017,(11p).
X. Mao, et al, "Least squares generative adversarial networks," arXiv:1611.04076v3 [cs.CV] Apr. 5, 2017,(16p).
Ting-Chun Wang et al., "High-resolution image synthesis and semantic manipulation with conditional gans," provided by the Computer Vision Foundation, (10p).
Haoyue Shi, et al., "Loss functions for person image generation." in BMVC, 2020,(13p).
D. Ulyanov, et al, "Instance normalization: The missing ingredient for fast stylization," arXiv:1607.08022v3 [cs:CV], Nov. 6, 2017, (6p).
E. Agustsson, et al., "Soft-to-hard vector quantization for end-to-end learning compressible representations," arXiv:1704.00648v2 [cs.LG], Jan. 8, 2017, (16p).
Tsung-Yi Lin, et al., "Microsoft coco: Common objects in context," in European conference on computer vision. Springer, 2014, (16p).
R. Franzen, "Kodak lossless true color image suite," source: https://r0k.us/graphics/kodak, (3p).
M. Heusel, et al., "Gans trained by a two time-scale update rule converge to a local nash equilibrium," 31st Conference on Neural Information Processing Systems (NIPS 2017), Long Beach, CA, USA, (12p).

* cited by examiner

END-TO-END DEEP GENERATIVE NETWORK FOR LOW BITRATE IMAGE CODING

FIELD

The present application relates to neural networks for image coding, and in particular but not limited to, to end-to-end deep generative adversarial networks for low bitrate image coding.

BACKGROUND

Generative adversarial network (GAN)-based image compression approaches reconstruct images with highly realistic quality at low bit rates. However, currently there is no published GAN-based image compression approach that utilizes advanced GAN losses, such as the Wasserstein GAN with gradient penalty loss (WGAN-GP), to improve the quality of reconstructed images. Meanwhile, existing deep learning-based image compression approaches require extra convolution layers to estimate and constrain the entropy during training, which makes the network larger and may require extra bits to send information to the decoder.

SUMMARY

The present disclosure provides examples of techniques relating to GAN based image compression with novel discriminator and generator loss functions and a simple entropy estimation approach.

According to a first aspect of the present disclosure, there is provided a neural network system implemented by one or more computers for compressing an image. The neural network system may include a generator including an encoder, an entropy estimator, and a decoder, where the encoder may receive an input image and generate an encoder output, a plurality of quantized feature entries are obtained based on the encoder output outputted at a last encoder block in the encoder, the entropy estimator may receive the plurality of quantized feature entries associated with the encoder output and calculate an entropy loss based on the plurality of quantized feature entries, and the decoder may receive the plurality of quantized feature entries and generate a reconstructed image.

Furthermore, the neural network system may include a discriminator that determines whether the reconstructed image different from the input image based on a discriminator loss.

According to a second aspect of the present disclosure, there is provided a method for compressing an image. The method may include that an encoder in a generator in a neural network system receives an input image and generates an encoder output. The encoder may obtain a plurality of quantized feature entries based on the encoder output outputted at a last encoder block in the encoder. An entropy estimator in the generator may receive the plurality of quantized feature entries and calculates an entropy loss based on the plurality of quantized feature entries. Furthermore, a decoder in the generator may receive the plurality of quantized feature entries and generate a reconstructed image. Moreover, a discriminator in the neural network system may determine whether the reconstructed image different from the input image based on a discriminator loss.

According to a third aspect of the present disclosure, there is provided an apparatus for compressing an image. The apparatus may include one or more processors and a memory configured to store instructions executable by the one or more processors. The one or more processors, upon execution of the instructions, may be configured to perform acts including: receiving, by an encoder in a generator in a neural network system, an input image and generating, by the encoder, an encoder output; obtaining, by the encoder, a plurality of quantized feature entries based on the encoder output outputted at a last encoder block in the encoder; receiving, by an entropy estimator in the generator, the plurality of quantized feature entries and calculating, by the entropy estimator, an entropy loss based on the plurality of quantized feature entries; receiving, by a decoder in the generator, the plurality of quantized feature entries and generating, by the decoder, a reconstructed image; and determining, by a discriminator in the neural network system, whether the reconstructed image different from the input image based on a discriminator loss.

According to a fourth aspect of the present disclosure, there is provided a non-transitory computer readable storage medium, including instructions stored therein, wherein, upon execution of the instructions by one or more processors, the instructions cause the one or more processors to perform acts including receiving, by an encoder in a generator in a neural network system, an input image and generating, by the encoder, an encoder output; obtaining, by the encoder, a plurality of quantized feature entries based on the encoder output outputted at a last encoder block in the encoder; receiving, by an entropy estimator in the generator, the plurality of quantized feature entries and calculating, by the entropy estimator, an entropy loss based on the plurality of quantized feature entries; receiving, by a decoder in the generator, the plurality of quantized feature entries and generating, by the decoder, a reconstructed image; and determining, by a discriminator in the neural network system, whether the reconstructed image different from the input image based on a discriminator loss.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1A:
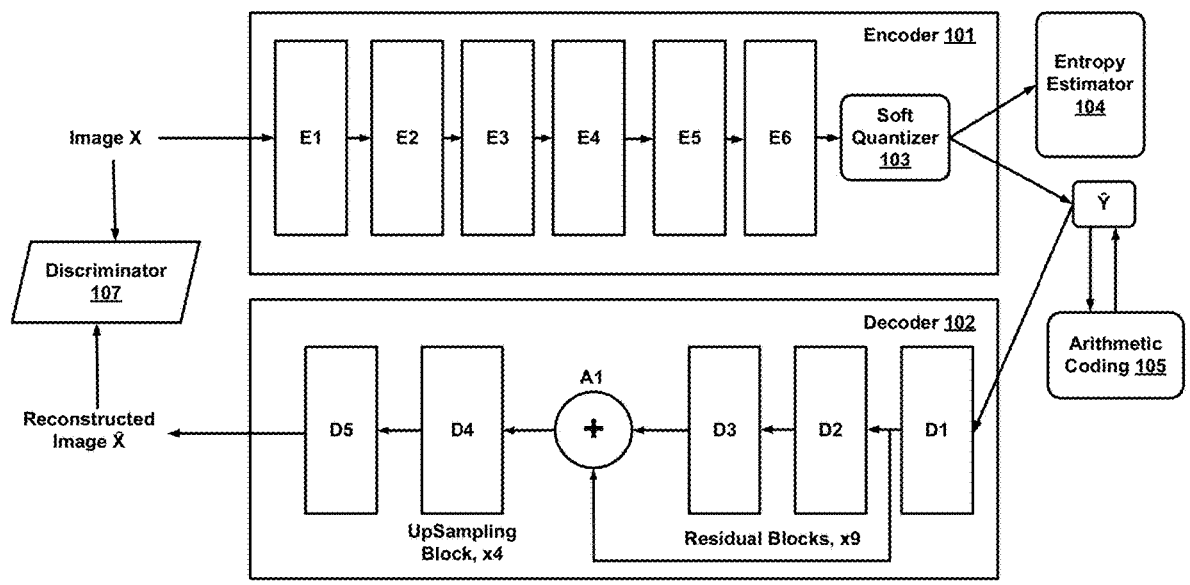
FIG. 1A illustrates a hinge GAN-GP system with a simple entropy estimated including a generator and a discriminator in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The present disclosure provides a new GAN for image compression with novel discriminator and generator loss functions and a simple entropy estimation approach. The new loss functions in the present disclosure outperform the current GAN loss for low bitrate image compression. Furthermore, the entropy estimation approach does not require extra convolution layers but still works well to constrain the number of bits during training.

Deep learning-based image compression approaches have outperformed traditional image compression approaches, such as JPEG2000, in terms of the quality of reconstructed images, and are even comparable to BPG. Such approaches use several transform layers trained in an end-to-end manner to minimize the rate-distortion function:

$$\min \text{Rate} + \lambda \text{ Distortion}, \quad (1)$$

where $\lambda$ is a control factor. However, the distortion in these approaches is usually the mean square error (MSE), which alone may not capture the visual reality under a low bit-rate. A least squares generative adversarial network (LS-GAN) may be used for image compression.

Since the adversarial learning nature of GAN can generate photo-realistic images, using a generator as the encoder-decoder for image compression at low bitrates will decode images with better perceptual quality. However, LS-GAN does not control the bit-rate during training. An entropy loss may be used in GAN-based image compression methods to control bit-rates. The entropy loss may be estimated using extra network layers, so the whole GAN model becomes much larger, and requires sending side information to decoders.

The present disclosure provides an end-to-end GAN-based approach for low bit-rate image compression. In the present disclosure, novel discriminator and generator loss functions are disclosed to enhance the quality of decoded images. The disclosed discriminator loss improves the original WGAN-GP loss with a hinge loss, which only penalizes incorrect classification results. The disclosed generator, including encoder and decoder, loss includes a content loss that combines mean absolute error (MAE) and multi-scale structural similarity (MS-SSIM), which decodes images with more texture details and higher perceptual quality. Additionally, the present disclosure provides a simple entropy estimation method, which produces the entropy loss to trade off the bit rates and decoding quality. This method does not require training additional convolution layers and avoids sending side information to the decoder.

Generative Adversarial Network (GAN)

A generative adversarial network may include a generator, G, to transform noises into photo-realistic images, and a discriminator, D, to distinguish generated images from real images. Since the traditional GAN algorithm is unstable in training, several advanced GAN algorithms including the Wasserstein GAN (WGAN) algorithm which adopts weight clipping to enforce a Lipschitz constraint on the discriminator are used to cure the traditional GAN algorithm being unstable in training. The WGAN-GP algorithm adds a soft constraint on the norm of the gradient to encourage the discriminator to be 1-Lipschitz. Its discriminator is trained by minimizing the following loss function:

$$L = \mathbb{E}_{[f_D(\tilde{X})]} - \mathbb{E}_{[f_D(X)]} + \lambda \mathbb{E}_{[(\|\nabla_{\hat{x}} f_D(\hat{X})\|_2 - 1)^2]} \quad (2)$$

where $\hat{X}$ is the interpolation between the real data X and the generated data $\tilde{X}$, and $f_D(\cdot)$ is the discriminator. While $f_D(X)$ is expected to output 1, $f_D(\tilde{X})$ is expected to output −1. Although these advanced GAN algorithms addressed the problem of instable training, their discriminator loss penalizes both correct and incorrect classification results, which is inefficient.

GAN for Deep Image Compression

Furthermore, an LS-GAN-based approach is used for extremely low bit-rate image compression. However, this LS-GAN-based approach does not utilize entropy loss to trade off bit rates and image quality, which cannot adapt to different transmission bandwidth requirements. Moreover, a multi-scale patch-based discriminator is used, which can only tell real or fake between local patches, instead of global images. Further, the HiFiC model uses a deep conditional GAN with a hyper-prior for entropy estimation. However, HiFiC does not target at low bitrate image compression and adding a hyper-prior model makes GAN model larger. Besides, MSE is adopted in the LS-GAN-based approach and the HiFiC model as the content loss, which is not a perceptual quality metric and is inferior to SSIM in decoding images consistent with the human vision system (HVS).

Figure 1B:
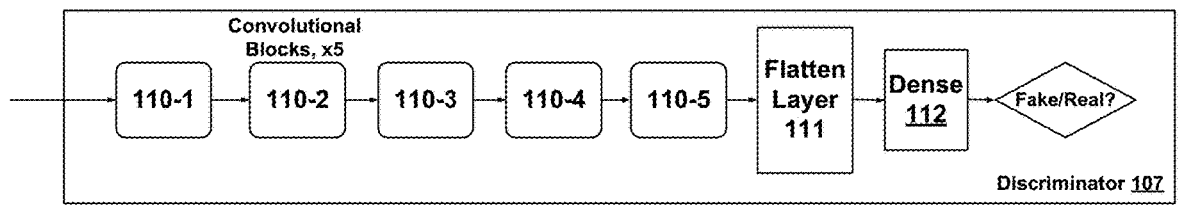
FIG. 1B illustrates a discriminator as shown in FIG. 1A in accordance with some examples of the present disclosure.

FIGS. 1A-1B show a GAN architecture for the low bitrate image compression in accordance with some examples of the present disclosure. A novel GAN loss function and simple entropy estimator are disclosed. The discriminator tells "real," i.e., ground-truth, input images from "fake," i.e., decoded, ones. The disclosed entropy estimator avoids extra model parameters and sending side information to the decoder, which are required by the hyper-prior model.

As shown in FIG. 1A, the GAN based neural network system includes a generator and a discriminator 107. The generator may include an encoder 101, a decoder 102 and an entropy estimator 104. The encoder 101 may include a plurality of stacked encoder blocks E1, E2, . . . , En, where n is a positive integer. FIG. 1A shows six encoder blocks E1-E6 but the number of the plurality of encoder blocks is not limited to the number illustrated in FIG. 1A.

In some examples, the six encoder blocks E1-E6 in FIG. 1A may be all convolutional blocks. For example, the encoder block E1 may be a convolutional block having filter number 60, filter size 7×7, and stride 1. Further, the encoder block E2 may be a convolutional block having filter number 120, filter size 3×3, and stride 2. The encoder block E3 may be a convolutional block having filter number 240, filter size 3×3, and stride 2. The encoder block E4 may be a convolutional block having filter number 480, filter size 3×3, and stride 2. The encoder block E5 may be a convolutional block having filter number 960, filter size 3×3 and stride 2. The encoder block E6 may be a convolutional block having filter number 16, filter size 3×3 and stride 1. The filter number, filter size and stride in the plurality of encoder blocks are not limited to the numbers described above.

The parameters of the encoder blocks above are not limited to the examples above. For example, the filter sizes of the encoder blocks E1-E6 may be 3×3, 4×4, 5×5, 7×7, etc. The larger a filter size is, the higher the accuracy is but the higher the complexity is and also a higher memory is required. Furthermore, the strides of the encoder blocks E1-E6 may be 1, 2, etc. For example, when the stride of a convolutional block is 1, the resolution of the output is kept as the same as the resolution of the input, and when the stride of a convolutional block is 2, the resolution of the output is half of the resolution of the input. These parameters may be empirically set. To get better image compression performance, slight changes may be made to these parameters.

In some examples, the plurality of encoder blocks may include convolutional blocks with leaky rectified linear unit (LeakyReLU) as an activation function having an alpha parameter as 0.2. The alpha parameter is the slope of the activation function for the input number that is less than 0. In some examples, the plurality of encoder blocks may include instance normalization layers that normalize across all spatial dimensions per channel per sample, i.e., each sample of a batch is independently normalized.

As shown in FIG. 1A, the decoder 102 includes a plurality of stacked decoder blocks D1, D2, . . . , Dm, where m is a positive integer. The number of the plurality of decoder blocks is not limited to the number illustrated in FIG. 1A.

In some examples, the decoder blocks D1-D5 shown in FIG. 1A may be all convolutional blocks. For example, the decoder block D1 may be a convolutional block having filter number 16, filter size 3×3, and stride 1. Further, the decoder block D1 may include LeakyReLu as the activation function having the alpha parameter as 0.2. Moreover, the decoder block D1 may include an instance normalization layer. Furthermore, the decoder block D2 may be a convolutional block having filter number 960, filter size 3×3, and stride 1. Further, the decoder block D2 may include LeakyReLu as the activation function having the alpha parameter as 0.2. The decoder block D2 may include an instance normalization layer.

Furthermore, the decoder block D3 may be a convolutional block having filter number 960, filter size 3×3, and stride 1. The decoder block D3 may include an instance normalization layer. The decoder block D4 may be a transposed convolutional block having filter number 480, filter size 3×3 and stride 2. Further, the decoder block D4 may include LeakyReLu as activation function having the alpha parameter as 0.2. Moreover, the decoder block D4 may include an instance normalization layer.

Moreover, the decoder block D5 may be a convolutional block having filter number 3, filter size 7×7 and stride 1. The decoder block D5 may include a hyperbolic tangent (tan h) activation layer that applies the tan h function on the layer inputs. The filter number, filter size and stride in the plurality of decoder blocks are not limited to the numbers described above.

The parameters of the decoder blocks above are not limited to the examples above. For example, the filter sizes of the decoder blocks D1-D5 may be 3>3, 4×4, 5×5, 7×7, etc. The larger the filter size is, the higher the accuracy is but the higher the complexity is and also a higher memory is required. Furthermore, the strides of the decoder blocks D1, D4 and D5 may be 1, 2, etc. For example, when the stride of a convolutional block is 1, the resolution of the output is kept as the same as the resolution of the input. These parameters may be empirically set. To get better image compression performance, slight changes may be made to these parameters. The stride of D2 and D3 should be 1.

As shown in FIG. 1A, the decoder blocks D2-D3 and the element-wise additional block A1 may form a residual block and the residual block may be repeatedly used. For examples, the residual block including the decoder blocks D1-D3 and the element-wise additional block A1 may be repeatedly used for 9 times. Furthermore, the decoder block D4 may be a UpSampling block which is a transposed convolution neural network. When the stride of a transposed convolution neural network is 2, the resolution of the output is twice of the resolution of the input. The UpSampling block may be repeatedly used. For example, the UpSampling block may be repeatedly used for 4 times.

As shown in FIG. 1A, an input or original image X is input into the encoder block D1 in the encoder 101 and the last encoder block, such as D6 in FIG. 1A, may output an encoder output corresponding to the input image X. The encoder output may be then sent to the entropy estimator 104. The entropy estimator 104 may calculate an entropy loss which is described below.

In some examples, the encoder output outputted by the last encoder block may be sent to the soft quantizer 103 which generates a plurality of quantized feature entries, such as $\hat{Y}_{tijk}$ described below. The entropy estimator 104 may then receive the plurality of quantized feature entries and then calculate the entropy loss. Additionally, an arithmetic coding 105 may apply a standardized binary arithmetic coding to encode all quantized feature entries in the quantized tensor $\hat{Y}$ to binary representations based on the probability dictionary and send the quantized feature to the decoder 102. The decoder may receive the quantized feature and output a reconstructed image $\tilde{X}$.

Furthermore, the discriminator 107 may determine whether the reconstructed image $\tilde{X}$ different from the input image X based on the discriminator loss described below. FIG. 1B illustrates the discriminator in the disclosed GAN based neural network system shown in FIG. 1A. The discriminator 107 may include a plurality of stacked convolutional blocks, a flatten layer 111, and a dense layer 112. A flatten layer may make the multidimensional input one-dimensional and a dense layer may be a simple layer of neurons in which each neuron receives input from all the neurons of previous layer.

The number of the plurality of convolutional blocks is not limited to the number illustrated in FIG. 1B. As shown in FIG. 1B, the discriminator 107 includes the convolutional blocks 110-1, 110-2, ..., 110-5. For example, the convolutional blocks 110-1, 110-2, 110-3, 110-4, 110-5 may respectively have filter number 156, 256, 32, 32, and 32. Furthermore, the convolutional blocks 110-1, 110-2, 110-3, 110-4, 110-5 may all have filter size 3×3 and stride 2. The filter number, filter size and stride in the plurality of convolutional blocks are not limited to the numbers described above. The discriminator 107 may receive an image at the convolutional block 110-1 and determine whether the image is "real" based on the ground truth. As shown in FIG. 1B, the convolutional block 110-2 may be repeatedly used. For example, the convolutional block 110-2 may be repeatedly used for 5 times.

The parameters of the convolutional blocks in the discriminator 107 above are not limited to the examples above. For example, the filter sizes of the convolutional blocks 110-1, 110-2, 110-3, 110-4, 110-5 may be 3×3, 4×4, 5×5, 7×7, etc. The larger the filter size is, the higher the accuracy is but the higher the complexity is and also a higher memory is required. Furthermore, the strides of the convolutional blocks 110-1, 110-2, 110-3, 110-4, 110-5 may be 1, 2, etc. For example, when the stride of a convolutional block is 1, the resolution of the output is kept as the same as the resolution of the input. These parameters may be empirically set. To get better image compression performance, slight changes may be made to these parameters.

Hinge GAN-GP Loss for Image Compression

In some examples, the WGAN-GP loss L in (2) may be improved using the hinge GAN-GP loss. The discriminator may be updated by:

$$\min_D \mathbb{E}\,[\max(0, 1 - f_D(X))] + \qquad (3)$$
$$\mathbb{E}\,[\max(0, 1 + f_D(\tilde{X}))] + \lambda_1 \mathbb{E}\,[(\|\nabla_{\hat{x}} f_D(\hat{X})\|_2 - 1)^2]$$

where $\lambda_1$ is the weight of the gradient penalty. In (3), $f_D(X)$ is expect to approach 1, and $f_D(\tilde{X})$ is expected to approach −1. If $f_D(X) \geq 1$ or $f_D(\tilde{X}) \leq -1$, the classification is correct and will not be penalized. Only when $f_D(X) < 1$ or $f_D(\tilde{X}) > -1$, the loss is penalized, therefore the trained discriminator is more effective than the one trained by (2), which penalizes both correct and incorrect classification results.

Additionally, the generator may be trained by:

$$\min_G (L_g + \lambda_2 L_{content}), \qquad (4)$$

where $L_g = \mathbb{E}\,[-f_D(\tilde{X})]$ is the adversarial loss and $f_D(\tilde{X})$ is expected to output 1. Further, the content loss $L_{content}$ may be obtained by:

$$L_{content} = \mathbb{E}\,[(1-\alpha)\mathrm{MAE}(\tilde{X},X) - \alpha MS\text{-}SSIM(\tilde{X}X)] \qquad (5)$$

where $\lambda_2$ controls the effect of the content loss. The disclosed content loss may consist of a mean absolute error (MAE) between the decoded image $\tilde{X}$ and the original image X, which effectively prevents color shift in decoding images, and a negative MS-SSIM score, which captures perceptual loss and decodes images with more texture details.

Instance Normalization, Quantization, and Entropy Estimator

In some examples, $Z \in \mathbb{R}^{T \times C \times W \times H}$ is the output tensor of the activation function of the encoder network's last layer, where T, C, W, and H are the batch size, channel number, width and height of Z, respectively. For each entry $Z_{tijk}$ in Z, where $1 \leq t \leq T$, $1 \leq i \leq C$, $1 \leq j \leq W$ and $1 \leq k \leq H$, the output $Y_{tijk}$ of the instance normalization is:

$$Y_{tijk} = \frac{z_{tijk} - \mu_{ti}}{\sqrt{\sigma_{ti}^2 + \epsilon}}, \qquad (6)$$

$$\text{where } \mu_{ti} = \frac{1}{HW} \sum_{l=1}^{W} \sum_{m=1}^{H} Z_{tilm}, \qquad (7)$$

$$\sigma_{ti}^2 = \frac{1}{HW} \sum_{l=1}^{W} \sum_{m=1}^{H} (Z_{tilm} - \mu_{ti})^2. \qquad (8)$$

According to the above equations (7) and (8), the neural network system may calculate the mean and variance of Z along the width and height directions for the $t^{th}$ image and the $i^{th}$ channel. $\epsilon$ in (6) is a small positive number that prevents the denominator from being zero. (6) implies that the mean and the standard deviation of all entries in Y are 0 and 1, respectively. $Y_{tijk}$ is define to be $Y_{tijk} \sim \mathcal{N}(0,1)$ to establish a simple entropy model.

In some examples, a set of integer quantization centers C={−2, −1, 0, 1, 2} are adopted and each feature element $Y_{tijk}$ may be quantized to its nearest neighbor in set C by:

$$\hat{Y}_{tijk} = \arg\min_{c_l \in C} |Y_{tijk} - C_l|. \qquad (9)$$

In some examples, the cumulative distribution function (CDF) of the standard normal distribution may be denoted as $\Phi(\Psi)$. Since $Y_{tijk}$ values that lie in the interval $(\tilde{Y}_{tijk} - 0.5,$ $\tilde{Y}_{tijk}+0.5$) are quantized as $\check{Y}_{tijk}$, the discrete probability $p(\check{Y}_{tijk})$ may be approximated as $\Phi(\tilde{Y}_{tijk}+0.5)$, $-\Phi(\tilde{Y}_{tijk}-0.5)$. Since all $Y_{tijk}$ values lying in $(-\infty, -1.5)$ are quantized as $-2$, the discrete probability $p(\check{Y}_{tijk}=-2)$ is approximated as $\Phi(\tilde{Y}_{tijk}+0.5)-\Phi)-\infty)=-\infty)=\Phi(\tilde{Y}_{tijk}+0.5$. Similarly, all $Y_{tijk}$ values lying in $(1.5, +\infty)$ are quantized as 2, so the discrete probability $p(\check{Y}_{tijk}=2)$ is approximated as $\Phi(+\infty)-\Phi(\tilde{Y}_{tijk}-0.5)=1-\Phi(\tilde{Y}_{tijk}-0.5)$. Therefore, the estimated entropy of all entries $\check{Y}_{tijk}$ in $\check{Y}$ is:

$$L_{entropy} = \mathbb{E}\left[-\log_2 p(\check{Y}_{tijk})\right] \quad (10)$$

$$\begin{cases} \mathbb{E}\{-\log_2 \Phi(\tilde{Y}_{tijk}+0.5)\}, \check{Y}_{tijk} = -2, \\ \mathbb{E}\{-\log_2[1-\Phi(\tilde{Y}_{tijk}-0.5)]\}, \check{Y}_{tijk} = 2, \\ \mathbb{E}\{-\log_2[\Phi(\tilde{Y}_{tijk}+0.5)-\Phi(\tilde{Y}_{tijk}-0.5)]\}, \text{otherwise.} \end{cases}$$

In some examples, the distribution of $Y_{tijk}$ may be modeled by the standard Laplacian distribution, which demonstrates that the standard Normal distribution assumption renders better performance.

In some examples, because in the training process the hard quantization in (9) is not differentiable, differentiable soft quantization may be used:

$$\bar{Y}_{tijk} = \sum_{c_l \in C} \frac{\exp(-\sigma|Y_{tijk}-c_l|)}{\sum_{c_h \in C} \exp(-\sigma|Y_{tijk}-c_h|)} c_l. \quad (11)$$

The quantized feature then becomes:

$$\hat{Y}_{tijk} = \text{stop\_gradient}(\check{Y}_{tijk}-\bar{Y}_{tijk})+\bar{Y}_{tijk}, \quad (12)$$

where the stop_gradient function indicates that in the backward pass, only the gradient of $\bar{Y}_{tijk}$ is propagated to update network parameters, and the gradient of $\check{Y}_{tijk}-\bar{Y}_{tijk}$ is not propagated. In the forward pass, $\hat{Y}_{tijk}=\check{Y}_{tijk}$ as in (9), and a probability dictionary is construed for the 5 quantized centers. Then, a standardized binary arithmetic coding may be applied to encode all entries $\hat{Y}_{tijk}$ in the quantized tensor $\hat{Y}$ to binary representations based on the probability dictionary.

The Total Generator Loss

In some examples, $\lambda_3$ is used to control the entropy loss and image quality so the total loss of the generator in (4) becomes:

$$\min_G L_g^{total} = \min_G (L_g + \lambda_2 L_{content} + \lambda_3 L_{entropy}), \quad (13)$$

where $L_{entropy}$ is defined in (10).

In some examples, 235,679 nonoverlapping 256×256 patches extracted from 118,287 images in the COCO dataset may be used to train the GAN models. An Adam optimizer with a learning rate of 0.0001 may be used while setting the batch size as 24 and the epoch number as 40. Models may be tested on images of 512×768 resolution, e.g., all 24 images of 512×768 resolution of the Kodak dataset, as it is a frequently used test set to evaluate the performance of traditional JPEG, BPG, and learned image compression algorithms.

In some examples, when targeting at perceptual quality, Fréchet Inception Distance (FID) score and the MS-SSIM may be used as the evaluation metrics for decoded images.

The FID score is given by:

$$\text{FID}=\|\mu_x-\mu_{\tilde{x}}\|^2+\text{Tr}(\Sigma_{\tilde{x}}+\Sigma_{\tilde{x}}-2(\Sigma_x\Sigma_{\tilde{x}})^{1/2}), \quad 14)$$

where X' and $\tilde{X}$' are the features of a pretrained Inception network, extracted from the original X and decoded image $\tilde{X}$, X'$\sim \mathcal{N}(\mu_{X'}, \Sigma_{X'})$, $\tilde{X}$'$\sim \mathcal{N}(\mu_{\tilde{x}'}, \Sigma_{\tilde{x}'})$ and Tr(•) is the trace of a matrix. A lower FID indicates that the distribution of the reconstructed images is closer to the distribution of the original images.

For the GAN models, the compressed feature dimensionality may be set to be 16×16×16. For the disclosed model, $\lambda_1$ in the discriminator loss of equation (3) may be empirically set to be 10, and $\lambda_2$ and $\lambda_3$ in the total generator loss of equation (13) may be set to be 100 and 10, respectively, which give good visual qualities of reconstructed images at a low bitrate. Furthermore, $\alpha$ in (5) may be empirically set to be 0.84.

In some examples, the low bitrate for 24-bit images may be no greater than 0.15 bits per pixel (bpp). Specifically, the low bitrate may include 0.10 bpp, 0.08 bpp, etc. For example, at 0.15 bpp, times of compression for 24-bit images may achieve 24 bpp/0.15 bpp, i.e., 160 times.

Figure 2A:
FIG. 2A illustrates two sample images from Kodak dataset.
Figure 2B:
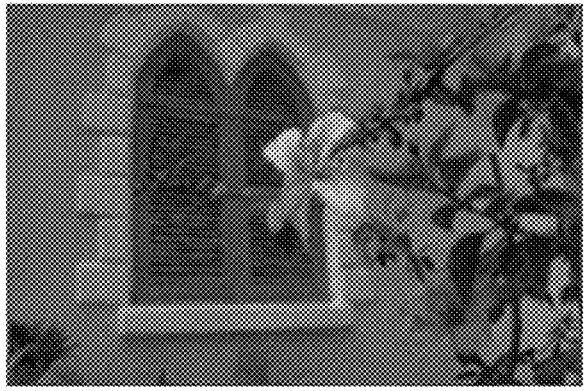
FIG. 2B illustrates visual qualities of two sample decoded test images of LS-GAN corresponding to the two sample images in FIG. 2A.
Figure 2B:
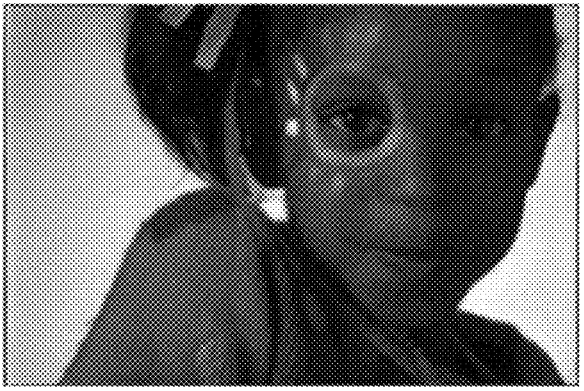
Figure 2C:
FIG. 2C illustrates visual qualities of the two sample decoded test images of BPG corresponding to the two sample images in FIG. 2A.
Figure 2C:
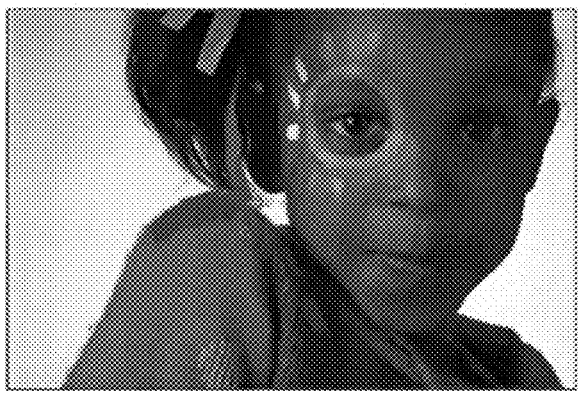
Figure 2D:
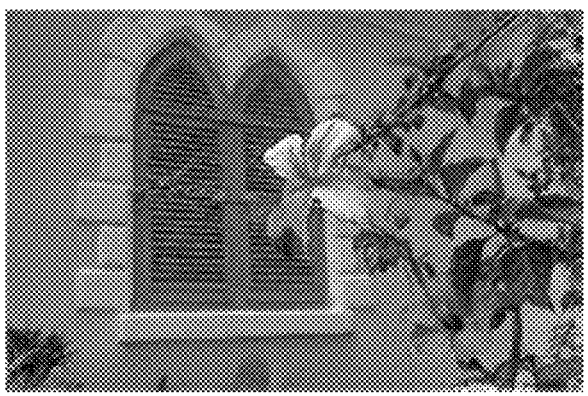
FIG. 2D illustrates visual qualities of the two sample decoded test images of WGAN-GP corresponding to the two sample images in FIG. 2A.
Figure 2D:
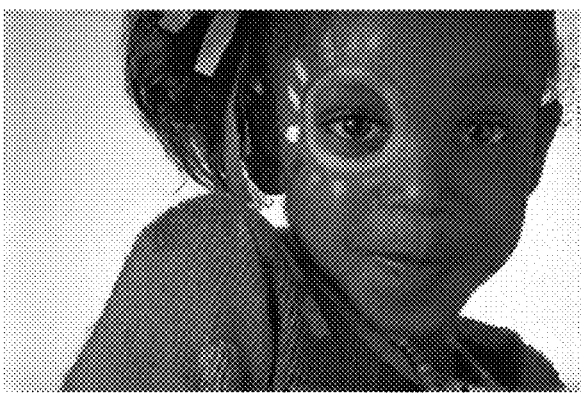
Figure 2E:
FIG. 2E illustrates visual qualities of two sample decoded test images of the disclosed hinge GAN-GP with standard Laplacian distribution assumption for compressed feature $Y_{tijk}$ in accordance with some examples of the present disclosure.
Figure 2F:
FIG. 2F illustrates visual qualities of the two sample decoded test images of the disclosed hinge GAN-GP with Normal distribution assumption for compressed feature in accordance with some examples of the present disclosure.

FIG. 2A shows two sample images from Kodak dataset. FIG. 2B shows visual qualities of two sample decoded test images of LS-GAN corresponding to the two sample images in FIG. 2A. FIG. 2C shows visual qualities of the two sample decoded test images of BPG corresponding to the two sample images in FIG. 2A. FIG. 2D shows visual qualities of the two sample decoded test images of WGAN-GP corresponding to the two sample images in FIG. 2A. FIG. 2E shows visual qualities of two sample decoded test images of the disclosed hinge GAN-GP with standard Laplacian distribution assumption for compressed feature $Y_{tijk}$ in accordance with some examples of the present disclosure. FIG. 2F shows visual qualities of the two sample decoded test images of the disclosed hinge GAN-GP with Normal distribution assumption for compressed feature in accordance with some examples of the present disclosure. Since different distribution assumptions can be made for $Y_{tijk}$ in (6), by comparing Normal distribution with Laplacian distribution, FIGS. 2A-2F show that Normal distribution assumption generates better results. For WGAN-GP, the generator is trained by (13), and the discriminator is trained by (2).

As illustrated in FIGS. 2A-2F, images decoded by the disclosed hinge GAN-GP have the highest visual quality and present clearer texture details. Decoded images of LS-GAN have unfaithful colors, decoded images of both LS-GAN and BPG are blurry in the window area, the girl's nose and red cloth areas, while decoded images of WGAN-GP have obvious noisy artifacts, such as the window, the green leaves, and the girl's head area.

TABLE 1

| | LS-GAN | BPG | WGAN-GP | Disclosed hinge GAN-GP (Laplacian distribution) | Disclosed hinge GAN-GP (Normal distribution) |
|---|---|---|---|---|---|
| Average bpp | 0.1280 | *0.0948* | 0.0957 | 0.0964 | 0.0928 |
| Average MS-SSIM | 0.8401 | 0.8932 | 0.8686 | 0.8748 | *0.8901* |
| FID | 98.07 | 107.40 | 91.40 | *79.53* | 75.68 |

Table 1 shows comparison of the above approaches on 24 Kodak images. The best value of each metric is bolded and the second-best value of each metric is italicized, respectively. In Table 1, the average bpp, FID and MS-SSIM scores of 24 Kodak test images are provided for all methods compared in FIGS. 2B-2F. The disclosed hinge GAN-GP with the normal distribution assumption has the best FID score at the lowest bit rate and its MS-SSIM is the second highest, only slightly worse than that of BPG. The reason that BPG has relatively higher MS-SSIM is because it more faithfully recovers the image color than GAN-based methods. However, the blurriness and block artifacts in BPG decoded images led to a high FID score, which represents low perceptual quality. This demonstrates that GAN can compress images with higher perceptual quality using adversarial learning.

Figure 3A:
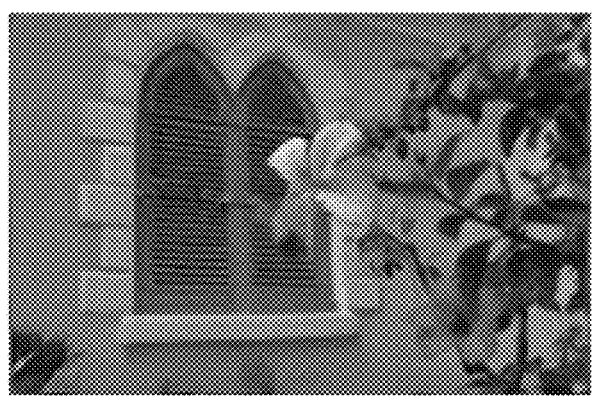
FIG. 3A shows rate-distortion performance of the HiFiC model.
Figure 3B:
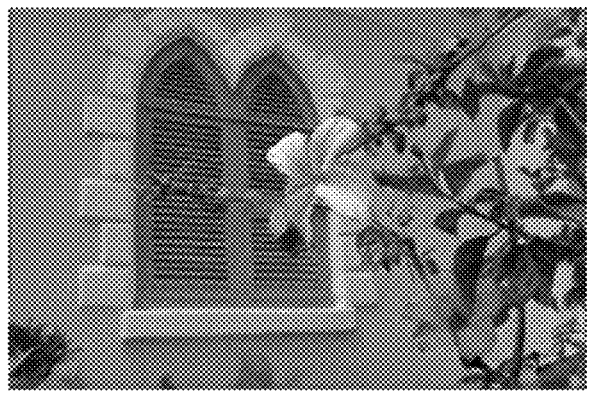
FIG. 3B shows rate-distortion performance of the disclosed hinge GAN-GP model in accordance with some examples of the present disclosure.

FIGS. 3A-3B compare the rate-distortion performance of the disclosed model and HiFiC. For the sample test image provided in FIG. 2A, HiFiC requires 42.5% more bit rates than the disclosed model, while its decoded image has a lower MS-SSIM value than the disclosed model. As shown in FIG. 3A, the bpp in HiFiC is 0.1310 and the MS-SSIM in HiFiC is 0.9013, the bpp in the disclosed Hinge GAN-GP in accordance with the present disclosure is 0.0919 and the MS-SSIM in the disclosed Hinge GAN-GP is 0.9288.

TABLE 2

| $\lambda_3$ in (13) | 50 | 20 | 10 |
|---|---|---|---|
| Average bpp | 0.0665 | 0.0840 | 0.0928 |
| Average MS-SSIM | 0.8488 | 0.8724 | 0.8901 |
| FID | 112.2 | 90.6 | 75.68 |

Table 2 shows effectiveness of the entropy estimator provided in the present disclosure. When $\lambda_3$ in (13) decreases, the average bit rate increases, FID scores decrease and the MS-SSIM values increase. Therefore, the entropy estimator provided in the present disclosure can effectively trade off bit rates and decoding quality. Besides, the FID of the disclosed model at 0.084 bpp is still much better than that of BPG at 0.0948 bpp as shown in Table 1. Here, the MS-SSIM is an indicator indicating whether the texture of reconstructed images is close to the texture of original images and a higher value of MS-SSIM indicates that the texture of reconstructed images is closer to the texture of original images. Additionally, the FID is an indicator indicating whether the reconstructed images look naturally like the original images and a smaller value of FID indicates that the reconstructed images look more naturally like the original images.

TABLE 3

|  | MSE | MAE | MAE + MS-SSIM |
|---|---|---|---|
| Average bpp | 0.0953 | 0.0941 | 0.0928 |
| Average MS-SSIM | 0.8625 | 0.8714 | 0.8901 |
| FID | 93.50 | 88.23 | 75.68 |

To demonstrate the effectiveness of the disclosed content loss in (13), Table 3 shows the disclosed GAN model in the present disclosure with different content losses on 24 Kodak images. The discriminator loss as the disclosed hinge GAN-GP loss in (3) is fixed, and the disclosed GAN model is trained with three content losses: MSE only, MAE only, and the disclosed MAE+MS-SSIM content loss in (13). The three trained models are trained on the 24 Kodak test images, and Table 3 lists the average bpp, MS-SSIM and FID. The disclosed GAN model with the disclosed MAE+MS-SSIM content loss has the best MS-SSIM and FID at the lowest bpp.

TABLE 4

|  | Encoder | Decoder | Discriminator | Entropy Estimator |
|---|---|---|---|---|
| The disclosed GAN model | 5660720 | 155011683 | 3049857 | 0 |
| LS-GAN | 5660688 | 155011683 | 2766529 | N/A |
| HiFiC | 7419700 | 166993947 | 2793117 | 5757460 |

Table 4 shows the total parameter numbers of the GAN models in comparison. Due to the simple entropy estimator, the disclosed hinge GAN-GP requires significantly less parameters than HiFiC. The disclosed discriminator in the present disclosure is slightly larger than that of LS-GAN, but the discriminator in LS-GAN was trained repeatedly three times for three different scales of images.

According to examples of the present disclosure, the disclosed entropy estimator in the hinge GAN-GP without parameters is simple but effective to reduce bit-rates. The disclosed loss functions improve previous GAN losses by retaining more textures and colors at a low bit rate. The images reconstructed by the disclosed hinge GAN-GP model are also more natural-looking than those decoded by BPG or GAN models at lower bit rates.

Figure 4:
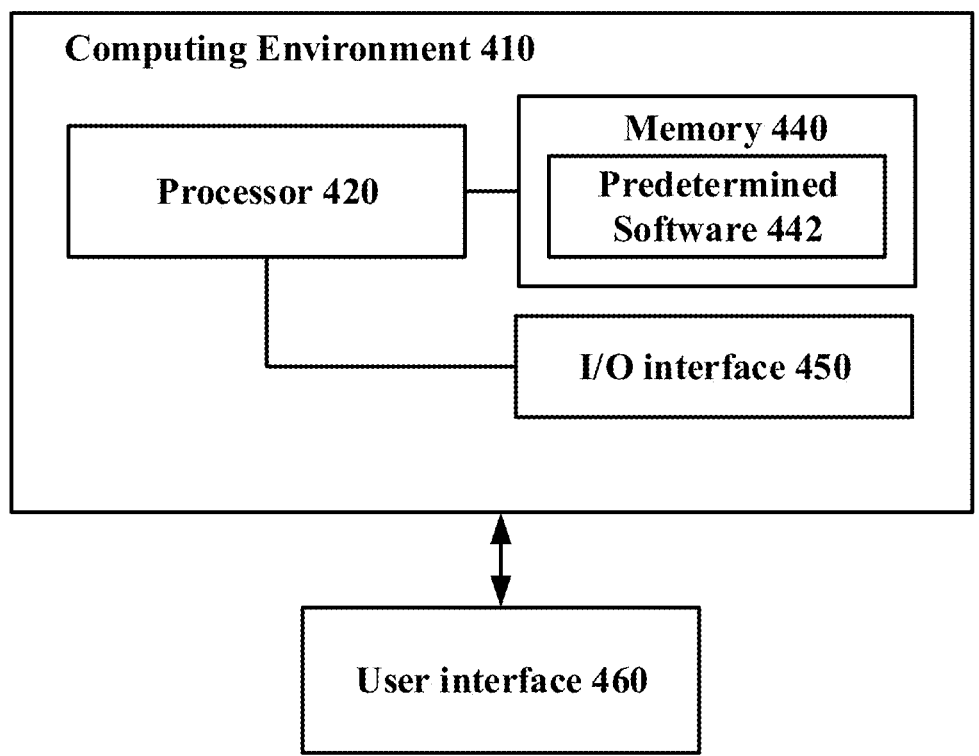
FIG. 4 is a block diagram illustrating an image compressing system in accordance with some implementations of the present disclosure.

FIG. 4 shows a computing environment or a computing device 410 coupled with a user interface 460. The computing environment 410 can be part of a data processing server. In some embodiments, the computing device 410 can perform any of various methods or processes (such as encoding/decoding methods or processes) as described hereinbefore in accordance with various examples of the present disclosure. The computing environment 410 may include one or more processors 420, a memory 440, and an I/O interface 450.

The one or more processors 420 typically controls overall operations of the computing environment 410, such as the operations associated with the display, data acquisition, data communications, and image processing. The one or more processors 420 may include one or more processors to execute instructions to perform all or some of the steps in the above-described methods. Moreover, the one or more processors 420 may include one or more modules that facilitate the interaction between the one or more processors 420 and other components. The processor may be a Central Processing Unit (CPU), a microprocessor, a single chip machine, a GPU, or the like.

The memory 440 is configured to store various types of data to support the operation of the computing environment 410. Memory 440 may include predetermine software 442. Examples of such data include instructions for any applications or methods operated on the computing environment 410, video datasets, image data, etc. The memory 440 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 450 provides an interface between the one or more processors 420 and peripheral interface modules, such as a keyboard, a click wheel, buttons, and the like. The buttons may include but are not limited to, a home button, a start scan button, and a stop scan button. The I/O interface 450 can be coupled with an encoder and decoder.

In some embodiments, there is also provided a non-transitory computer-readable storage medium including a plurality of programs, such as included in the memory 440, executable by the one or more processors 420 in the computing environment 410, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 410 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Figure 5:
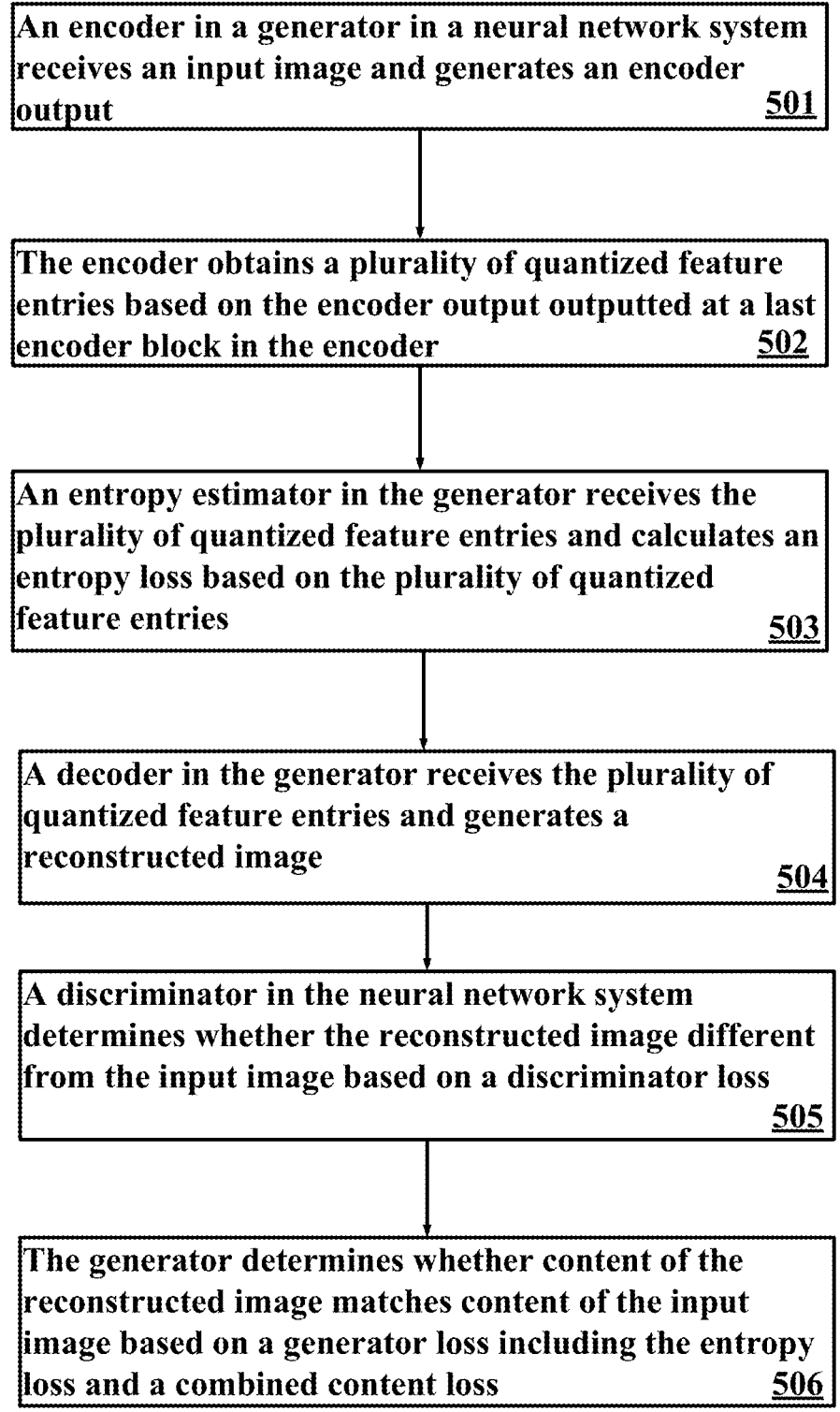
FIG. 5 is a flowchart illustrating a method for compressing an image according to an example of the present disclosure.

FIG. 5 is a flowchart illustrating a method for compressing an image according to an example of the present disclosure.

In step 501, the one or more processors 420 may receive an input image which may be an original image and generate an encoder output.

In some examples, as shown in FIG. 1A, the encoder output may be generated at the last encoder block E6.

In step 502, the one or more processors 420 may obtains a plurality of quantized feature entries based on the encoder output outputted at the last encoder block in the encoder.

In step 503, the one or more processors 420 may receive a plurality of quantized feature entries and calculate an entropy loss based on the plurality of quantized feature entries, where the plurality of quantized feature entries are based on the encoder output outputted at the last encoder block E6 in the encoder.

In some examples, the plurality of quantized feature entries may include the feature entries $\hat{Y}_{tijk}$ and the entropy loss may be calculated according to (10). In some examples, differentiable soft quantization may be performed on the encoder output according to (11) and the plurality of quantized feature entries may be then obtained according to (12).

In some examples, the entropy of the plurality of quantized feature entries may be estimated based on a standard normal distribution.

In some examples, the plurality of quantized feature entries may be encoded using a standardized binary arithmetic coding by the arithmetic coding 105 as shown in FIG. 1A.

In step 504, the one or more processors 420 may receive the plurality of quantized feature entries and generate a reconstructed image.

In some examples, as shown in FIG. 1A, the reconstructed image may be generated at the last decoder block D5.

In step 505, the one or more processors 420 may determine whether the reconstructed image different from the input image based on a discriminator loss.

In some examples, discriminator loss may be used in training the discriminator. For example, the discriminator may classify both real data (real pictures as positive examples during training) and "fake" data (negative examples during training) generated by the generator. The discriminator loss penalizes the discriminator for misclassifying real data as "fake" or "fake" data as real. The discriminator may update its network weights through back-propagation from the discriminator loss through the discriminator network.

In some examples, the discriminator loss may include the hinge loss that only penalizes incorrect classification results.

In step 506, the one or more processors 420 may determine whether content of the constructed image matches content of the input image based on a generator loss.

In some examples, the generator loss may include the entropy loss. The generator loss may further include the combined content loss that includes an MAE and an MS-SSIM between the constructed image and the input image. Furthermore, the generator loss may include an adversarial loss. In some examples, the generator loss is used to train the generator and the generator is trained to minimize the generator loss by updating the generator network weights based on the generator loss.

In some examples, the one or more processors 420 may determine that the content of the constructed image matches the content of the input image when the combined content loss is less than a pre-determined threshold value. For example, as shown in Table 1, a pre-determined threshold value of the MS-SSIM value may be set to be 0.89 and a pre-determined threshold value of the FID value may be set to be 90. When the MS-S SIM value is higher than 0.89 and/or the FID value is less than 90, the average bpp will be accordingly less than 0.10, thus the constructed image matching the input image.

In some examples, the reconstructed image may be at a bitrate lower than a predetermined threshold. For example, when the bitrate is a low bitrate that is no greater than 0.15 bpp, the predetermined threshold may be less than 0.15 bpp, such as 0.10 bpp, 0.08 bpp, etc.

In some examples, there is provided an apparatus for compressing an image. The apparatus includes the one or more processors 420 and a memory 440 configured to store instructions executable by the one or more processors. Further, the one or more processors, upon execution of the instructions, are configured to perform a method as illustrated in FIG. 5.

In some other examples, there is provided a non-transitory computer readable storage medium, having instructions stored therein. When the instructions are executed by the one or more processors 420, the instructions cause the one or more processors 420 to perform a method as illustrated in FIG. 5.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A neural network system implemented by one or more computers for compressing an image, comprising:
a generator comprising an encoder, an entropy estimator, and a decoder,
wherein the encoder receives an input image and generates an encoder output, a plurality of quantized feature entries are obtained based on the encoder output outputted at a last encoder block in the encoder, the entropy estimator receives the plurality of quantized feature entries and calculates an entropy loss based on the plurality of quantized feature entries, and the decoder receives the plurality of quantized feature entries and generates a reconstructed image; and
a discriminator that determines whether the reconstructed image is different from the input image based on a discriminator loss,
wherein a generator loss comprises the entropy loss and a combined content loss, and the combined content loss comprises a mean absolute error (MAE) and a multi-scale structural similarity index measure (MS-SSIM) between the reconstructed image and the input image, and
wherein the generator is configured to determine whether content of the reconstructed image matches content of the input image based on the generator loss.

2. The neural network system of claim 1, wherein the plurality of quantized feature entries are obtained after performing soft quantization on the encoder output.

3. The neural network system of claim 1, wherein the plurality of quantized feature entries are encoded to binary representations using a standardized binary arithmetic coding and sent to the decoder.

4. The neural network system of claim 1, wherein entropy of the plurality of quantized feature entries is estimated based on a standard normal distribution.

5. The neural network system of claim 1, wherein the generator loss further comprises an adversarial loss.

6. The neural network system of claim 1, wherein the discriminator loss comprises a hinge loss that penalizes incorrect classification results.

7. The neural network system of claim 1, wherein the reconstructed image is at a bitrate lower than a predetermined threshold.

8. The neural network system of claim 1, wherein the discriminator updates discriminator network weights based on the discriminator loss, and the generator updates generator network weights based on the generator loss.

9. A method for compressing an image, comprising:
receiving, by an encoder in a generator in a neural network system, an input image and generating, by the encoder, an encoder output;
obtaining, by the encoder, a plurality of quantized feature entries based on the encoder output outputted at a last encoder block in the encoder;
receiving, by an entropy estimator in the generator, the plurality of quantized feature entries and calculating, by the entropy estimator, an entropy loss based on the plurality of quantized feature entries;
receiving, by a decoder in the generator, the plurality of quantized feature entries and generating, by the decoder, a reconstructed image;
determining, by a discriminator in the neural network system, whether the reconstructed image is different from the input image based on a discriminator loss, and
determining, by the generator, whether content of the reconstructed image matches content of the input image based on a generator loss, wherein the generator loss comprises the entropy loss and a combined content loss comprising a mean absolute error (MAE) and a multi-scale structural similarity index measure (MS-SSIM) between the reconstructed image and the input image.

10. The method of claim 9, further comprising:
obtaining the plurality of quantized feature entries after performing soft quantization on the encoder output.

11. The method of claim 9, further comprising:
encoding the plurality of quantized feature entries using a standardized binary arithmetic coding to binary representations and sending the plurality of quantized feature entries that are encoded to the decoder.

12. The method of claim 9, further comprising:
estimating entropy of the plurality of quantized feature entries based on a standard normal distribution.

13. The method of claim 9, wherein the generator loss further comprises an adversarial loss.

14. The method of claim 9, further comprising:
calculating, by the discriminator, the discriminator loss comprising a hinge loss that penalizes incorrect classification results.

15. The method of claim 9, wherein the reconstructed image is at a bitrate lower than a predetermined threshold.

16. The method of claim 9, further comprising:
updating discriminator network weights based on the discriminator loss, or
updating generator network weights based on the generator loss.

17. An apparatus for compressing an image, comprising:
one or more processors; and
a memory configured to store instructions executable by the one or more processors, wherein the one or more processors, upon execution of the instructions, are configured to perform acts comprising:
receiving, by an encoder in a generator in a neural network system, an input image and generating, by the encoder, an encoder output;
obtaining, by the encoder, a plurality of quantized feature entries based on the encoder output outputted at a last encoder block in the encoder;
receiving, by an entropy estimator in the generator, the plurality of quantized feature entries and calculating, by the entropy estimator, an entropy loss based on the plurality of quantized feature entries;
receiving, by a decoder in the generator, the plurality of quantized feature entries and generating, by the decoder, a reconstructed image;
determining, by a discriminator in the neural network system, whether the reconstructed image is different from the input image based on a discriminator loss, and
determining, by the generator, whether content of the reconstructed image matches the content of the original image based on a generator loss, wherein the generator loss comprises the entropy loss and a combined content loss comprising a mean absolute error (MAE) and a multi-scale structural similarity index measure (MS-SSIM) between the reconstructed image and the input image.

18. The apparatus of claim 17, wherein the one or more processors are configured to perform acts further comprising:
wherein the discriminator loss comprises a hinge loss that penalizes incorrect classification results.

* * * * *